May 12, 1925.
J. W. HARRIS
1,537,771
PULVERIZING HARROW
Filed Aug. 15, 1923
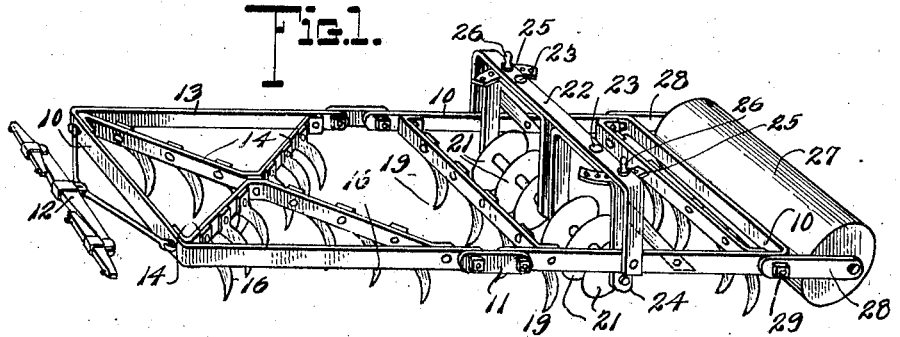
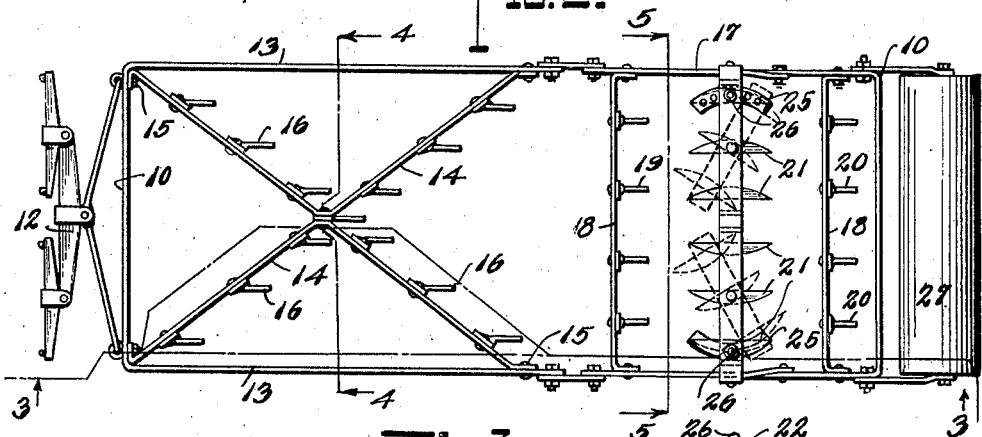
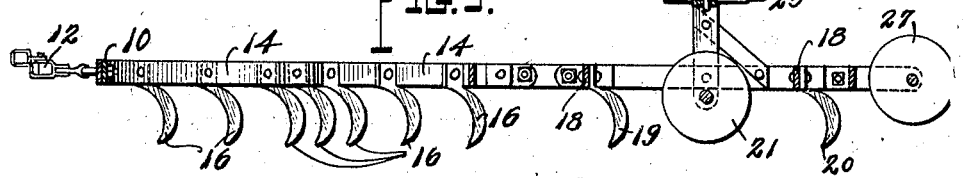
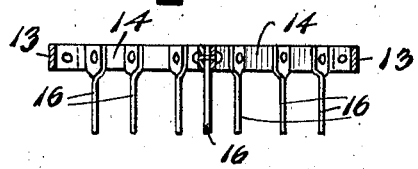
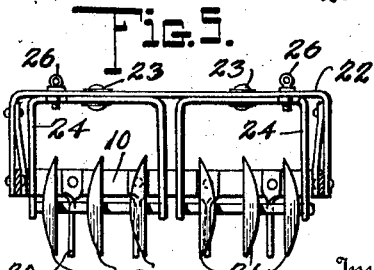
Witness
C.H. Wagner.
Inventor
J. W. Harris
By Robb Robb & Hill
Attorneys Patented May 12, 1925.

1,537,771

UNITED STATES PATENT OFFICE.

JAMES WALTON HARRIS, OF SELLERS, SOUTH CAROLINA.

PULVERIZING HARROW.

Application filed August 15, 1923. Serial No. 657,604.

*To all whom it may concern:*

Be it known that I, JAMES W. HARRIS, a citizen of the United States, residing at Sellers, in the county of Marion and State of South Carolina, have invented certain new and useful Improvements in Pulverizing Harrows, of which the following is a specification.

This invention relates to a pulverizing harrow, and particularly to a construction adapted to cut and crush the clods of earth in the passage of the harrow thereover. In implements of this character the clod cutting blades are usually arranged to act upon the earth in the direct line of draft and clods in many instances pass between the cutters and are not effectively pulverized after the passage of the harrow.

The present invention seeks to provide the clod cutting blades within the frame in such position as to force the undercut turf toward the center of the harrow where the rear section of blades acts thereon, effecting a double cutting or breaking of the clods and turf, particularly as a subsequent cutting action is effected at each side of the disk harrow carried by the frame.

The invention has for an object to provide a novel structure of cross frame disposed diagonally to the line of draft and carrying the clod cutting blades together with parallel transverse frames at the rear thereof carrying further cutting blades, the latter of which break up and level the earth which has been cut and turned by the disk harrows in order that it may be effectually pulverized by the roller carried by the frame.

A further object of the invention is to provide an adjustable mounting for the disk harrows by which the companion gangs thereof may be pivotally adjustable relative to each other and to the other earth working elements of the implement.

Other and further objects of the invention will be hereinafter set forth and the novel features thereof defined by the appended claims.

In the drawing:

Figure 1 is a perspective of the invention;
Figure 2 is a top plan thereof;
Figure 3 is a section on line 3—3 of Figure 2;
Figure 4 is a cross section on line 4—4 of Figure 2; and
Figure 5 is a similar view on line 5—5 of Figure 2.

Like numerals refer to like parts on the several figures of the drawing.

The numeral 10 designates the frame of the machine which may be of any desired size or configuration, and is preferably formed of two sections pivotally connected by a link 11 at each side which provides for the automatic adjustment of the frame to all conditions of land. The front frame 10 is provided with any desired form of draft connection, for instance as shown at 12, and between the side bars 13 of this frame diagonally disposed cross bars 14 are located. These bars preferably form an X-shaped structure and may comprise separate V-shaped members attached at their ends 15 to the frame. These members carry a series of clod cutting or breaking blades 16 so disposed that they separately act upon the earth clods so that one is cut before the next blade comes into action, which prevents any choking or dragging of the implement. These blades are preferably rearwardly inclined and curved, as shown in Figure 3, so as to secure the most effective cutting action, this shape being an important feature of the device.

The rear section of the harrow 10 has its side walls 17 connected by parallel straight cross bars 18 each carrying cutter blades 19 and 20, similar to those described in connection with the bars 14. Intermediate of the bars 18 two gangs of disk harrows 21 are mounted. These gangs are similar in construction and are pivotally supported upon the frame by means of a yoke 22 having the pivot 23 for the support 24 carrying the shaft of the disk harrows. This pivotal mounting provides for the adjustment of the harrows relative to each other or to the cutter blades. Any desired means may be used for retaining the parts in the adjusted positions, such for instance as the perforated sector 25 carried by the support 24 and held in adjusted position by the pin 26 extending through the yoke into said sector.

At the rear of the frame a pulverizing roller 27 is pivotally supported by means of the arms 28 pivoted at 29 upon the frame 10.

The operation of the invention will be apparent from the foregoing description, and it will be seen that the sections of the frame may be detached and separately used if desired, while the arrangement of the cross bars in the front section causes the earth to be drawn toward the center of the harrow by the inwardly diverging set of blades where it is rehandled by the outwardly diverging set of blades and delivered to the cutters carried by the straight transverse bar, which effectually prevents the escape of any clods from a thorough disintegration.

The disk harrows in their plowing action cut and turn the earth, leaving it rough and this condition is removed by the cutters upon the rear cross frame, at which point the pulverizing roller acts to effectually complete the operation, leaving the land perfectly level and pulverizing any small clods which remain. If ground has been sown, this roller compacts the earth above the speed, causing early germination and protecting it from birds or other pests.

The pivotal connection of the frame members permits it to work in high and low places simultaneously, and if the ground conditions permit the harrows may be separated and the section used which is best suited to the land to be worked.

The cutter blade arrangement presents the minimum of resistance to draft and leaves the land in such condition that the disk harrows operate to their full capacity.

While the specific construction of the invention has been shown and described, still changes and alterations may be made therein without departing from the spirit of the invention as defined by the appended claims.

Having thus described my invention, what I claim as new and desire to secure by Letters Patent is:—

1. In a harrow, a frame, parallel cross bars carried thereby, fixed clod cutting blades depending from said bars, a yoke disposed intermediate the parallel bars, gangs of disk harrows independently and adjusably pivoted upon said yoke to track intermediate said blades or at an angle thereto, a crushing roller supported at the rear of said frame by arms pivoted thereon, and a breaker frame pivotally connected to the front of the first mentioned frame and provided with clod cutting blades disposed in parallel transverse and longitudinal planes.

2. In a harrow, a frame, parallel cross bars carried thereby, fixed clod cutting blades depending from said bars, a yoke disposed intermediate the parallel bars, gangs of disk harrows independently and adjustably pivoted upon said yoke to track intermediate said blades or at an angle thereto, and a crushing roller supported at the rear of said frame by arms pivoted thereon.

In testimony whereof I affix my signature.

JAMES WALTON HARRIS.